(12) United States Patent
Snoswell

(10) Patent No.: US 10,415,331 B2
(45) Date of Patent: Sep. 17, 2019

(54) SOLIDS IN BOREHOLE FLUIDS

(71) Applicant: SCHLUMBERGER TECHNOLOGY CORPORATION, Sugar Land, TX (US)

(72) Inventor: David Snoswell, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 730 days.

(21) Appl. No.: 14/862,975

(22) Filed: Sep. 23, 2015

(65) Prior Publication Data
US 2016/0084022 A1 Mar. 24, 2016

(30) Foreign Application Priority Data
Sep. 23, 2014 (GB) .................................. 1416745.6

(51) Int. Cl.
*B29C 33/36* (2006.01)
*E21B 21/06* (2006.01)
(Continued)

(52) U.S. Cl.
CPC ............ *E21B 21/062* (2013.01); *B29C 33/36* (2013.01); *B29C 33/3842* (2013.01);
(Continued)

(58) Field of Classification Search
CPC ............ B29C 2035/0827; B29C 38/08; B29C 38/0805; B29C 43/02
(Continued)

(56) References Cited

U.S. PATENT DOCUMENTS

| 3,718,524 A | 2/1973 | Bright |
| 5,778,567 A | 7/1998 | Jager et al. |

(Continued)

FOREIGN PATENT DOCUMENTS

| DE | 19605208 A1 | 8/1997 |
| GB | 863616 A | 3/1961 |

(Continued)

OTHER PUBLICATIONS

Dick, M.A. et al., "Optimizing the Selection of Bridging Particles for Reservoir Drilling Fluids", SPE 5879, Society of Petroleum Engineers, Feb. 23-24, 2000, 8 pages.

(Continued)

*Primary Examiner* — Christina A Johnson
*Assistant Examiner* — Xue H Liu

(57) ABSTRACT

Solid polymer objects have size at least 0.5 mm in each of three orthogonal dimensions and shape such that each object has one or more edges, points or corners and/or has a plurality of projections which extend out from a core portion. Such objects may be included in a drilling fluid as a lost circulation additive intended to bridge fractures and mitigate fluid loss. Their angular shape features make it harder for them to slide over fracture faces or each other and helps them to bridge a fracture. A method of making these objects provides a travelling endless belt made of elastomer and defining mould cavities. The mould cavities are filled with a polyerisable liquid composition, which is cured in the mould as the belt advances, and the cured objects are ejected from a mould as the belt bends around a roller.

17 Claims, 5 Drawing Sheets

(51) Int. Cl.
   B29C 39/02    (2006.01)
   B29C 33/38    (2006.01)
   B29C 33/50    (2006.01)
   E21B 21/00    (2006.01)
   B29C 33/44    (2006.01)
   B29C 35/08    (2006.01)
   B29K 101/12   (2006.01)
   B29L 31/00    (2006.01)

(52) U.S. Cl.
   CPC .............. *B29C 33/44* (2013.01); *B29C 33/50* (2013.01); *B29C 39/02* (2013.01); *E21B 21/003* (2013.01); B29C 2035/0827 (2013.01); B29K 2101/12 (2013.01); B29K 2901/00 (2013.01); B29K 2995/0082 (2013.01); B29L 2031/772 (2013.01)

(58) Field of Classification Search
   USPC .......... 264/297.8, 297.1, 496, 313, 334, 494
   See application file for complete search history.

(56) References Cited

U.S. PATENT DOCUMENTS

| | | | |
|---|---|---|---|
| 7,255,821 B2* | 8/2007 | Priedeman, Jr. ...... | B29C 64/106 264/219 |
| 7,284,611 B2 | 10/2007 | Reddy et al. | |
| 7,799,743 B2 | 9/2010 | Way et al. | |
| 7,820,088 B2 | 10/2010 | Josephy et al. | |
| 8,401,795 B2 | 3/2013 | Kaageson-Loe et al. | |
| 2005/0093208 A1* | 5/2005 | Boyd ................ | B29C 67/0059 264/442 |
| 2007/0096369 A1* | 5/2007 | Webb .................. | B28B 5/025 264/334 |
| 2010/0044919 A1* | 2/2010 | Correia .............. | B28B 5/021 264/313 |
| 2012/0067501 A1 | 3/2012 | Lyons | |
| 2013/0075013 A1 | 3/2013 | Chillscyzn et al. | |
| 2013/0077996 A1 | 3/2013 | Hanson et al. | |
| 2013/0233546 A1 | 9/2013 | Liang et al. | |
| 2014/0087187 A1* | 3/2014 | Hawley ............... | C09C 1/025 428/402 |

FOREIGN PATENT DOCUMENTS

| | | |
|---|---|---|
| GB | 2419146 A | 4/2006 |
| JP | H05170566 A | 7/1993 |
| WO | 2005038862 A2 | 4/2005 |
| WO | 2015040595 A1 | 3/2015 |
| WO | 2015071787 A1 | 5/2015 |

OTHER PUBLICATIONS

Savari, Sharath et al., "Resilient Lost Circulation Material (LCM): A Significant Factor in Effective Wellbore Strengthening", Society of Petroleum Engineers, Jun. 20-21, 2012, 7 pages.

Savari, Sharath et al., "Engineered LCM Design Yields Novel Activating Material for Potential Application in Severe Lost Circulation Scenarios", SPE 164748, Society of Petroleum Engineer, Aug. 15-17, 2013, 10 pages.

Search Report for GB Patent Application No. GB1416745.6, dated Jan. 25, 2016, 4 pages.

Grimm, Todd, "5 new 3D Printers: In Short", Transcript, available from http://www.engineering.com/Videos-old/InShortChannel/Videold/3145/5-New-3D-Printers-In-Short.aspx at least as early as 2013, 6 pages.

Voxeljet Technology GmbH, "VXC800 the world's first continuous 3D printer," Nov. 2012, 1 page.

Maertens, "Custom-made Silicone Moulding Conveyors", available from https://www.maertens-conveyorbelts.com/silicone-moulding-conveyors/ at least as early as Sep. 2013, 1 page.

* cited by examiner

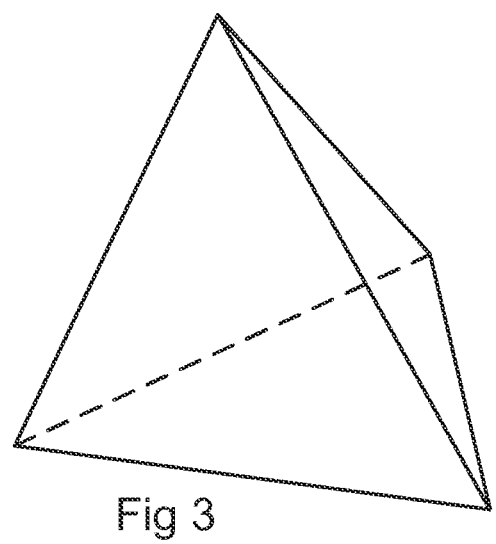
Fig 3
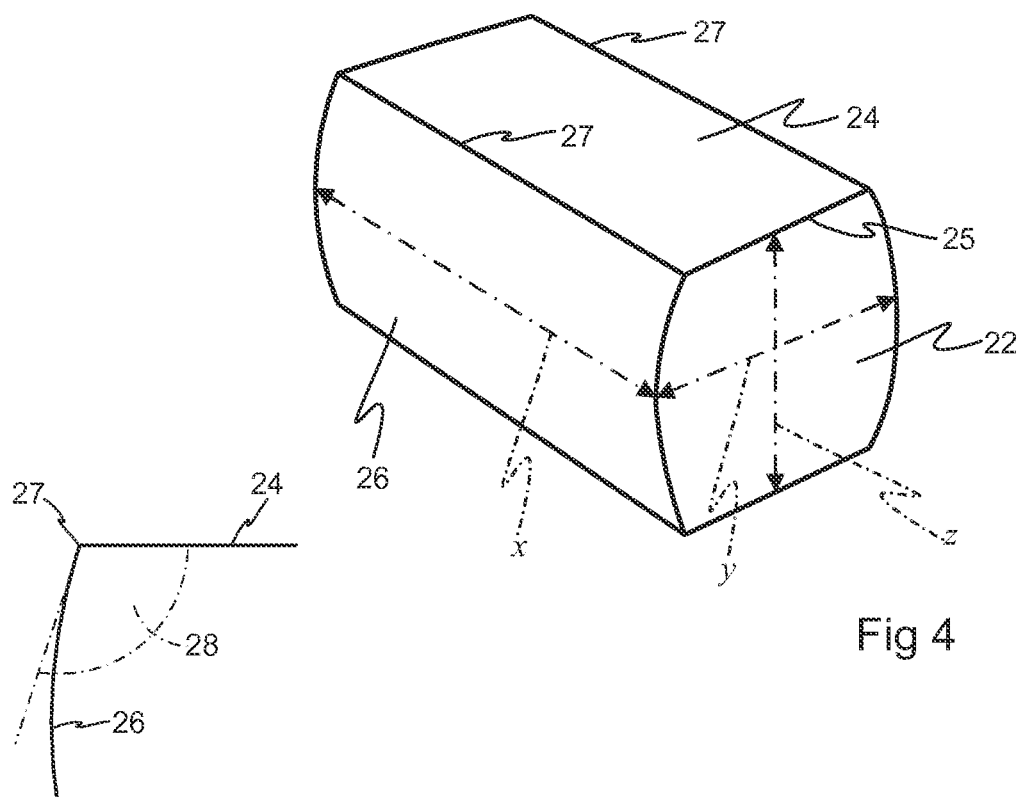
Fig 4
Fig 4a

SOLIDS IN BOREHOLE FLUIDS

CROSS-REFERENCE TO RELATED APPLICATIONS

This application claims the benefit of GB Application No. 1416745.6 filed on Sep. 23, 2014, of which is hereby incorporated by reference herein in its entirety.

BACKGROUND

A considerable range of fluids are used in the creation and operation of subterranean boreholes. These fluids may contain suspended solids for a number of purposes. Included within this broad category are drilling fluids which may contain suspended solids. One possibility is that a drilling fluid contains solid particles specifically intended to block fractures in formation rock and mitigate so-called lost circulation.

Lost circulation, which is the loss of drilling fluid into downhole earth formations, can occur naturally in formations that are fractured, porous, or highly permeable. Lost circulation may also result from induced pressure during drilling Lost circulation may also be the result of drilling-induced fractures. For example, when the pore pressure (the pressure in the formation pore space provided by the formation fluids) exceeds the pressure in the open borehole, the formation fluids tend to flow from the formation into the open borehole. Therefore, the pressure in the open borehole is typically maintained at a higher pressure than the pore pressure. However, if the hydrostatic pressure exerted by the fluid in the borehole exceeds the fracture resistance of the formation, the formation is likely to fracture and thus drilling fluid losses may occur. Moreover, the loss of borehole fluid may cause the hydrostatic pressure in the borehole to decrease, which may in turn also allow formation fluids to enter the borehole. The formation fracture pressure typically defines an upper limit for allowable borehole pressure in an open borehole while the pore pressure defines a lower limit. Therefore, a major constraint on well design and selection of drilling fluids is the balance between varying pore pressures and formation fracture pressures or fracture gradients though the depth of the well.

Several remedies aiming to mitigate lost circulation are available. These include the addition of particulate solids to drilling fluids, so that the particles can enter the opening into a fracture and plug the fracture or bridge the opening to seal the fracture. Documents which discuss such "lost circulation materials" include U.S. Pat. No. 8,401,795 and Society of Petroleum Engineers papers SPE 58793, SPE 153154 and SPE 164748.

One proposal to use particles of organic polymer as lost circulation material is U.S. Pat. No. 7,284,611 which mentions ground thermoset polymer laminate. Particle shape is not mentioned. One supplier of such material refers to it as flakes. This document also mentions an elastomer: again shape is not mentioned. U.S. Pat. No. 7,799,743 mentions granules of polypropylene, which is a thermoplastic polymer and requires particles to have an average resiliency of at least 10% rebound after compression of a quantity of articles by a pressure of 0.4 MPa. The shape of the particles is not mentioned.

SUMMARY

This summary is provided to introduce a selection of concepts that are further described below. This summary is not intended to be used as an aid in limiting the scope of the subject matter claimed.

As now disclosed herein, a borehole fluid comprises suspended solid objects which are made of polymeric material and which meet requirements as to size and shape. The fluid may be a drilling fluid and the objects in the fluid may counteract or mitigate loss of fluid into fractures in the formation being drilled. If a fracture is created in a formation during drilling or if a natural fracture is encountered, the fluid entering the fracture can carry some of the solid objects into the fracture, for them to form a bridge or plug which closes the pathway for fluid loss. The objects may themselves block the fracture or they may act jointly with other solids in the fluid to form a plug which closes the fracture.

An aspect of the present disclosure provides a method of making solid objects formed of polymeric material, having sufficient rigidity to sustain their own shape, wherein the objects have an overall size extending at least 0.5 mm in each of three orthogonal dimensions and wherein the objects have a shape such that each object has one or more edges, points or corners and/or comprises a core portion with a plurality of projections which extend out from the core portion. The method comprises providing at least one mould for the objects, filling the mould with a curable liquid organic pre-polymer composition, curing the composition to a solid state in the mould and then releasing the cured objects from the mould.

The requirement for a size of at least 0.5 mm in at least three dimensions has the consequence that these objects cannot fit inside a sphere of diameter less than 0.5 mm. In some embodiments the objects are larger than this. Possibly the objects will be too large to fit within a sphere of 1 mm or 1.5 mm diameter but small enough to fit within a sphere of 6 mm or 8 mm diameter.

These objects have features of shape such that they are not smooth globules. It is envisaged that this will reduce their ability to slide over the fracture faces or one another, so assisting them to form a bridge across a crack or fracture.

There are several possibilities for shapes, and these possibilities are not mutually exclusive. One possibility is that an object has a shape which is at least partially bounded by surfaces which intersect at an edge. Angles between at least some edges may possibly be not more than 150° and may be less such as not more than 120° or not more than 100°. There may be distinct corners where three surfaces and three edges meet. A corner may be such that the included angle in each of two planes intersecting at right angles is not more than 120° and possibly not more than 100°. An alternative parameter is solid angle: a corner may be such that the included solid angle is not more than 1.7 steradians, which is slightly more than the solid angle (0.5π steradians) subtended by the corner of a cube. Another possibility is that a shape may include one or more points.

A point may be such that one or more surfaces which converge to the point include a solid angle of not more than 1 steradian and possibly include a solid angle of not more than 0.8 or 0.7 steradian. A cone with an angle of 35° includes approximately 1 steradian and a cone with an angle of 30° includes 0.78 steradian. A point may be a corner at which a plurality of surfaces coincide and include a solid angle which is less than the solid angle at the corner of a cube, or it may be formed by the convergence of a single surface, as is the case with the tip of a cone. Yet another possibility for a shape is a projection from a core. Projections from a core may possibly extend out from the core for a distance which is greater than the distance across the core itself. Projections may terminate in a point or corner or may terminate in a flat face.

Shapes with edges, corners, points or projections are able to lodge in a fracture by engaging with each other or by engaging with the formation rock.

It is envisaged that the objects will be rigid under surface conditions to allow mechanical handling of them. Rigidity of the objects may be defined as ability of the objects to maintain their own shape under atmospheric pressure at temperatures up to at least 40° C. and possibly up to higher temperatures such as up to 60° C. However, the objects may have the property of resiliency which may be such that there is an average of at least 10% rebound after compression of a sample quantity of objects with a pressure of 0.4 MPa as specified in U.S. Pat. No. 7,799,743.

When carried downhole in a borehole fluid the objects will be subjected to hydrostatic pressure above atmospheric, but this may not distort their shape whilst they are suspended in the fluid. If there is any distortion of their shape by pressure on them after they lodge in a fracture, this may assist in plugging the fracture opening.

The polymer may be an organic (i.e carbon based) polymer material, commonly referred to as a plastic, which may be a thermoplastic to provide resiliency. Examples of thermoplastic polymers include polystyrene, polyethylene and polypropylene homopolymers and acrylonitrile-butadiene-styrene copolymer. Such polymers may have a specific gravity in a range from 0.7 to 1.3 and possibly in a narrower range from 0.8 to 1.0 or 1.2. It is also possible that the polymer is a polysiloxane which has a polymer chain of silicon and oxygen atoms. Polysiloxanes may have a specific gravity in a ranger from 0.9 or 1.0 up to 1.2 or 1.3. Such a specific gravity may be similar to the specific gravity of a borehole fluid. This is useful for solid objects or particles suspended in a borehole fluid because they will have less tendency to settle out than particles of higher specific gravity and similar size. Settling out of particles can be problematic especially if the circulation of fluid is interrupted. In consequence, the objects according to this disclosure may be larger than would be acceptable for particles of higher specific gravity and by reason of larger size they may be suitable for blocking larger fractures.

It is possible that a polymer may be less dense than a borehole fluid. In some embodiments, to mitigate any problems caused by buoyancy of objects, the polymer may be mixed with a denser filler to raise its specific gravity towards neutral buoyancy in the borehole fluid.

As mentioned above, the method comprises providing at least one mould for the objects, filling the mould with a curable liquid organic pre-polymer composition, curing the composition to a solid state in the mould and then releasing the cured objects from the mould.

The moulds may be formed of a flexible polymer and used in a procedure where the moulds are filled with a curable liquid, the composition in the moulds is cured to a solid state and the objects are ejected by bending the moulds. This may be implemented as a process in which the moulds are formed in a moving belt which travels around a bend where the cured objects are ejected. The bend may be where the belt passes over a wheel or roller. The belt may be an endless belt which returns the empty moulds to be filled again. The composition with which the moulds are filled may be an organic pre-polymer which is cured to a solid form by irradiation with ultra-violet light.

BRIEF DESCRIPTION OF THE DRAWINGS

FIGS. 3 to 6 show a number of objects which may be moulded by a process as disclosed here;

DETAILED DESCRIPTION

Figure 1:
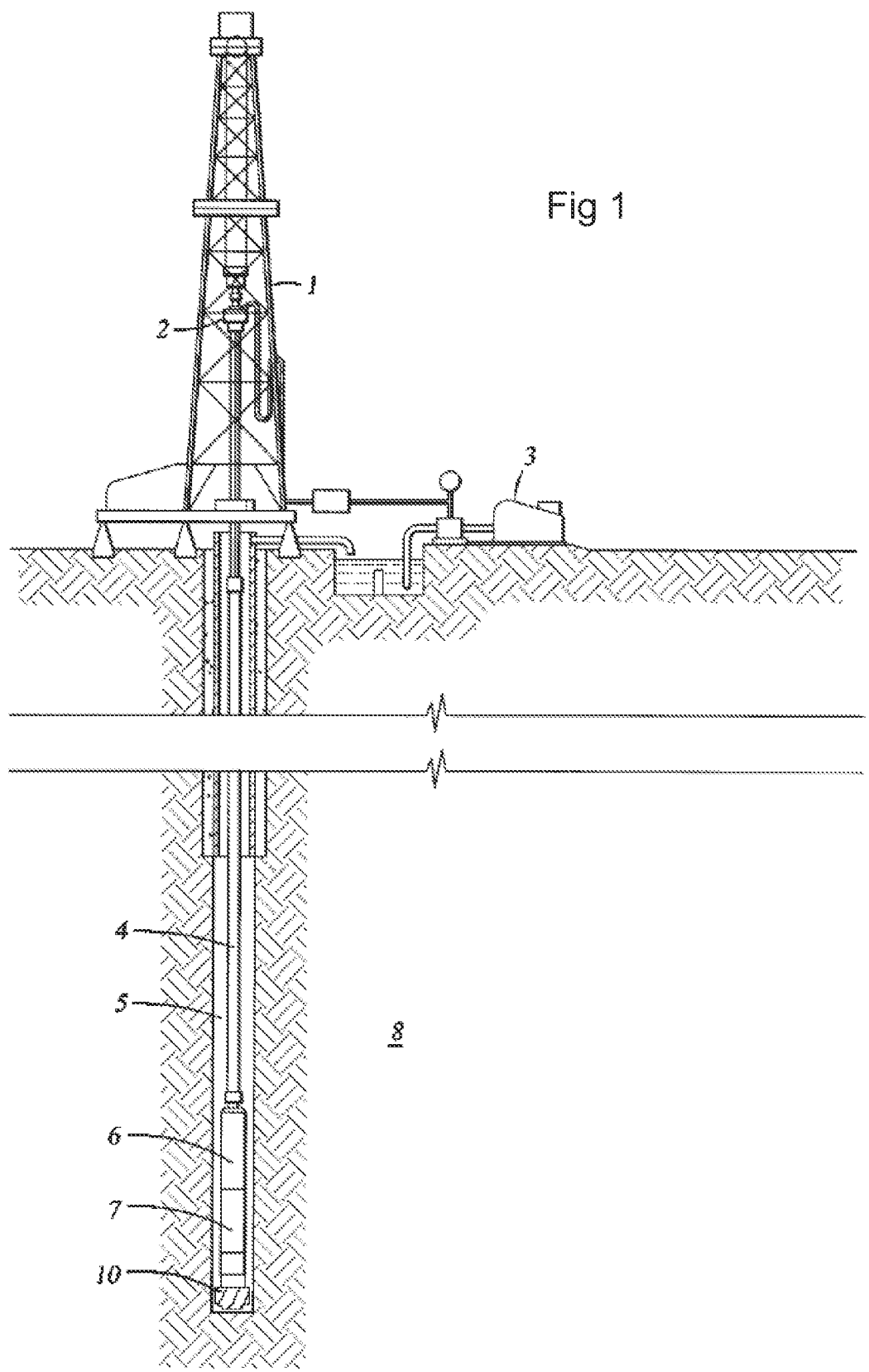
FIG. 1 diagrammatically illustrates a drill string in a wellbore.
Figure 2:
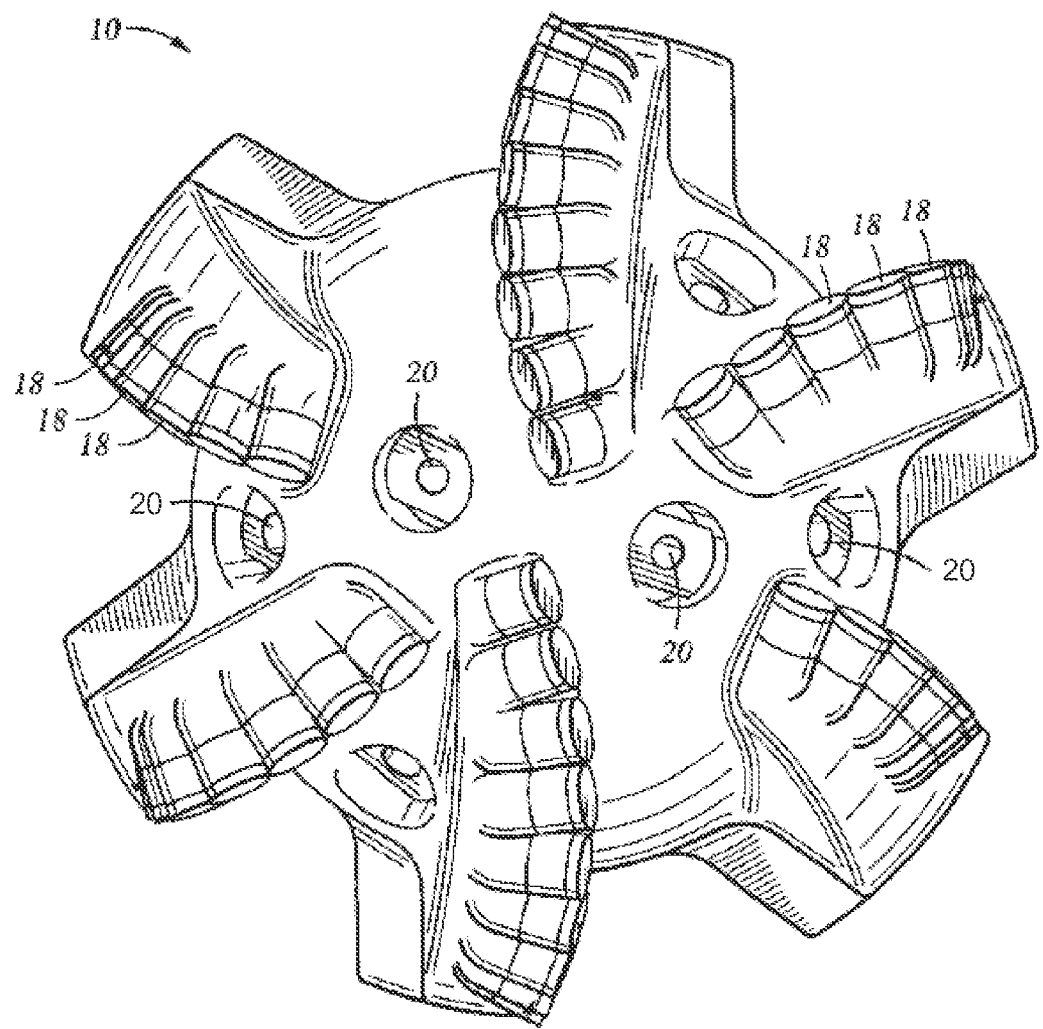
FIG. 2 shows an end view of one example of a drill bit.

FIG. 1 shows the drilling of a borehole through rock formations 8. The drill bit 10 is coupled to the lower end of a drill string 4, which typically includes segments of drill pipe (not shown separately) coupled together. The drill bit 10 is coupled to the drill string 4 through a bottom hole assembly 6 and 7. The drill string 4 may be rotated by a rotary table (not shown in FIG. 1) or a top drive system 2 which is itself hoisted and lowered by a drilling rig 1. As shown by FIG. 2 the drill bit has a body supporting cutters 18. Drilling fluid ("drilling mud") is circulated through the drill string 4 by mud pumps 3. The drilling mud is pumped down the interior of the drill string 4 and through the bottom hole assembly to passages through the drill bit 10. These passages through the body of the drill bit terminate at jets 20 shown by FIG. 2 After being discharged through the jets 20, the drilling mud returns to the earth's surface through an annular space 5 around the exterior of the drill string 4 in the borehole.

The circulating drilling fluid provides hydrostatic pressure to prevent the ingress of formation fluids into the wellbore, cools and lubricate the drill string and bit and removes drill cuttings from the bottom of the hole to the surface. Drilling fluid compositions may be water-or oil-based and may include weighting agents, surfactants, polymeric thickeners and other materials.

If there is a fracture in the formation rock penetrated by the borehole, drilling fluid may leak into this fracture and be lost. FIGS. 3 to 6 show a number of small plastic objects which may be made by the process disclosed here and suspended in drilling fluid as an expedient to block any such fractures and mitigate fluid loss. For instance FIG. 3 shows a tetragon, which is a symmetrical triangular pyramid with each face formed by an equilateral triangle so that all faces are equal in shape and size. The angle at each corner of each triangular face is of course 60°. If a corner is viewed in two orthogonal directions, the included angles appear as 60° or less. The solid angle included at each corner of a regular tetragon is less than $0.5\pi$ steradians. In one example, these tetragons have a length along each side of 1 mm.

FIG. 4 schematically illustrates an object which is approximately cuboidal with two opposite planar faces 22 parallel to each other (only one is visible in FIG. 4). A pair of opposite surfaces 24 and a second pair of opposite surfaces 26 extend between the faces 22. The faces 24 are planar and parallel to each other. The surfaces 26 are slightly curved. As shown by double headed arrows, the object has dimensions x, y and z along three orthogonal axes. Each of x, y and z is over 1 mm but none exceeds 5 mm.

The surfaces 22 meet surfaces 24 at edges 25 and the angle between the two surfaces is approximately 90°. The surfaces 24 meet surfaces 26 at edges 27. As shown by FIG. 4a, the angle 28 included at an edge 27 can be taken as the angle between plane face 24 and a tangent to surface 26 at the edge 27. In this example, these angles are not more than 120°. Where three edges meet at a corner all the angles between edges are less than 120° and two are approximately 90°.

Some surfaces of the objects shown in FIGS. 3 and 4 may have some surface roughness, not shown in the drawing, which may mean that the edges are not sharp, but when viewed as a whole, an object has visible edges and corners.

Figure 5:
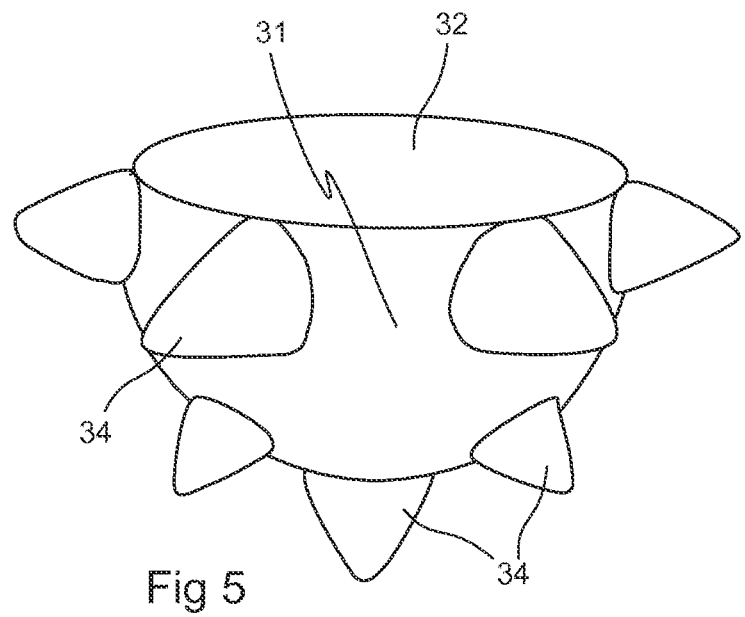

FIG. 5 shows a further possibility for an object. It has a main body 31 which is approximately hemispherical with a flat face 32 and a plurality of projections 34 from the body 31, although not from the flat face 32. The projections 34 are cones with a cone angle not exceeding 30° and terminating in a blunted point. Because the cone angle is not more than 30°, the included solid angle at each blunted point is not more than 0.78 steradians.

Figure 6:
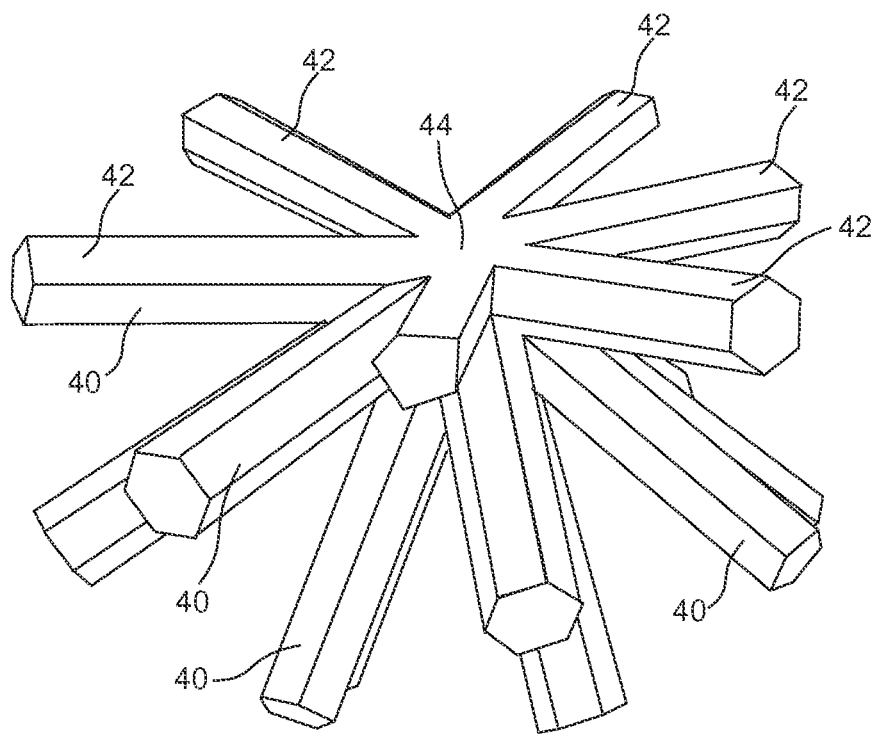

FIG. 6 shows another possible object. It has a small core with a number of projections 40 which extend outwards for a distance which is more than the distance across the core. The projections have polygonal cross-sections and some of them have faces 42 which all lie in a single flat plane. The core also has a surface area 44 contiguous with the surfaces 42 and lying in the same plane. Thus all parts of the object are at the same side of the plane of the surfaces 42.

The objects shown in FIGS. 3 to 6 may all be made with dimensions to allow them to pass through the passages in a drill bit and the jets 20. The size may be such that one object can fit within an imaginary sphere of 8 mm or possibly 6 mm diameter. These objects are made large enough that they extend for at least 0.5 mm in each of three orthogonal dimensions and so could not fit within a sphere of diameter less than 0.5 mm. Possibly they are made large enough so that they cannot fit inside an imaginary sphere of larger diameter such as 1 mm or 1.5 mm diameter.

If drilling fluid is leaking into a fracture in the formation rock and carries any of the objects of FIGS. 3 to 6 into the fracture, the edges, corners, points and/or projections of the objects may engage with roughness of the formation rock or with other objects and assist the objects to form a bridge across the fracture. These features of shape will also hinder them from sliding or rolling over one another, compared to smooth spheroidal particles sliding or rolling over one another, and this will also assist them in bridging and blocking a fracture. Once a blockage has formed, any continuing leakage through openings in the blockage will carry solids of the drilling fluid into these openings, thereby reducing the permeability of the blockage.

It will be appreciated that the objects shown in these FIGS. 3 to 6 all have at least one planar surface and so can be moulded using a liquid composition which is allowed to solidify in a mould with an open top mould cavity.

For the tetragon of FIG. 3, the tetragonal mould cavity has a corner of a tetragon at its lowest point and one of the flat faces of the tetragon is formed by the surface of the liquid composition in the mould. For the cuboids of FIG. 4, one of the flat faces 22 or 24 is formed by the surface of the liquid in the mould. The objects of FIG. 5 are moulded in the orientation shown in the drawing, so that the surface of the liquid in the mould forms the face 32 of the object. Similarly the objects of FIG. 6 are moulded in the orientation shown in FIG. 6, so that the surface of the composition in the mould forms the surfaces 42, 44 which lie in a common plane.

Figure 7:
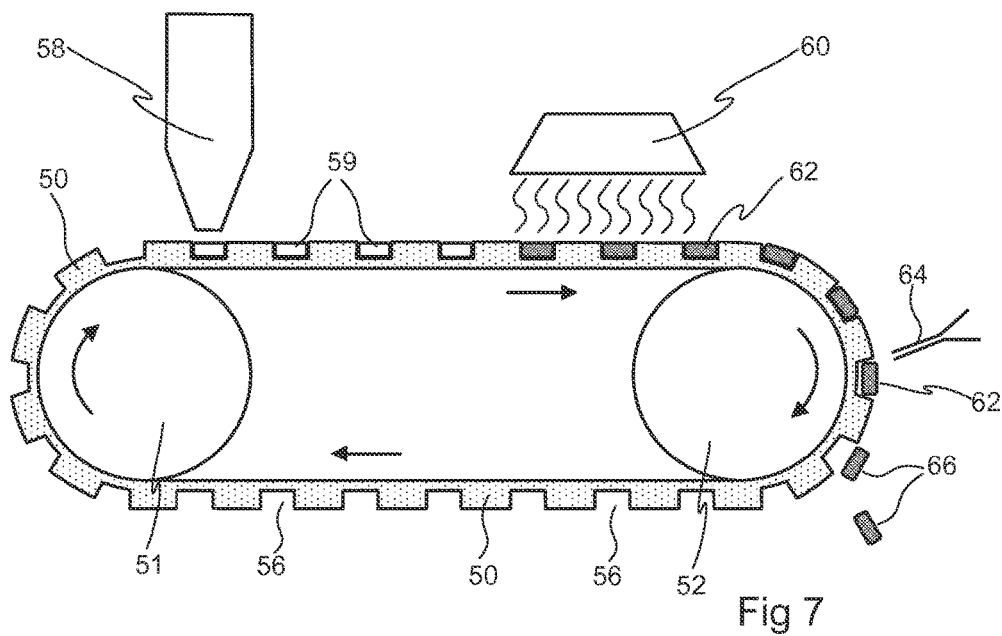
FIG. 7 shows a machine for moulding objects.
Figure 8:
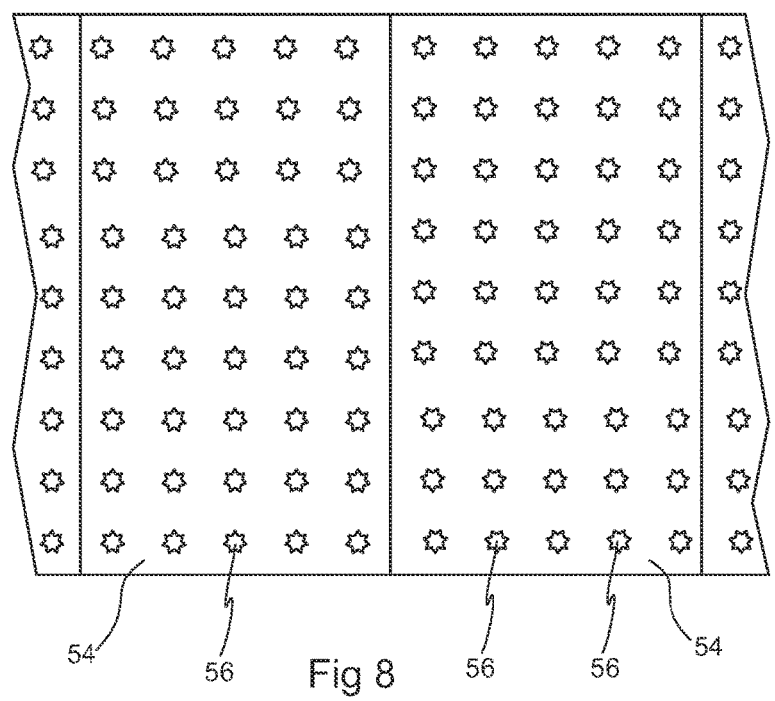
FIG. 8 is a view onto a part of the endless belt used in the machine of FIG. 7.

FIGS. 1 and 8 show apparatus for making objects, such as those of FIGS. 3 to 6, by the method of this invention. As shown by FIG. 7 the apparatus has an endless belt 50 running over rollers 51, 52 in the direction indicated by arrows. The belt 50 is made up of a number of rectangular sections 54 made of a flexible elastomeric material and joined together edge to edge.

As shown by FIG. 8 each section 54 has an array of individual mould cavities 56 extending inwardly from the exposed surface of the belt. In FIG. 8 the open mouths of the cavities 56 are shown as a star shape, as would be the case for making an object with projections from a central core. In FIG. 7 the cavities 56 are schematically indicated as rectangular.

As the belt 50 travels around the rollers 51, 52, a filling mechanism 58 dispenses a photocurable liquid composition into each cavity. Cavities containing liquid composition are indicated at 59. The belt then passes under lamps 60 which direct ultra-violet or visible light onto the belt, causing photocuring of the composition which polymerises and solidifies. The belt then passes around roller 52 where bending the elastomeric belt 50 causes the mouths of the cavities 56 to open, allowing the moulded objects 62 to be dislodged by a jet of air from nozzle 64 and fall out as shown at 66.

The photocurable liquid composition dispensed into the moulding cavities 56 by the filling mechanism 58 contains one or more materials capable of undergoing polymerisation, together with a photoinitiator such that exposure of the composition to visible or ultra-violet radiation causes the photo initiator to liberate reactive species which react with the polymerisable material and cause polymerisation to begin.

The photo initiator is a compound that it is capable of generating a reactive species effective to initiate polymerisation upon absorption of actinic radiation preferably in the range from 250 to 800 nm. The initiating species which is generated may be a cation or a free radical.

A type I radical photo initiator undergoes a unimolecular bond cleavage (α-cleavage) upon irradiation to yield the free radical. A type II radical photo initiator undergoes a bimolecular reaction where the triplet excited state of the photoinitiator interacts with a second molecule, which may be another initiator molecule, to generate a free radical. Typically, the second molecule is a hydrogen donor. Where the second molecule is not another initiator molecule, it may be an amine, alcohol or ether acting as a coinitiator. Preferably, the coinitiator is an amine, most preferably a tertiary amine.

Type I cleavable photo-initators include benzoin ethers, dialkoxy acetophenones, phosphine oxide derivatives, amino ketones, e.g. 2-dimethyl, 2-hydroxyacetophenone, and bis(2,4,6-trimethyl benzoyl) phenyl phosphine oxide.

Type II initiator systems (photoinitiator and coinitiator) include aromatic ketones e.g. camphorquinone, thioxanthone, anthraquinone, 1-phenyl 1,2 propanedione, combined with H donors such as alcohols, or electron donors such as amines.

A cation photo-initiator is preferably a photoacid generator, typically a diazonium or onium salt, e.g. diaryliodonium or triarylsulphonium hexafluorophosphate.

Photo initiator will generally be a small percentage of the polymerisable composition. The percentage of photo initiator in the composition is likely to be a least 0.5% by weight and may extend up to 3% or even 5% by weight of the liquid components of the composition.

The polymerisable composition will generally comprise one or more polymerisable monomers which contain two groups able to participate in the polymerization reaction. Such monomers can extend a growing polymer chain and are likely to provide at least 50% probably at least 80% or 85% of the liquid components of the polymerizable composition. These monomers may be accompanied by a minor proportion of monomers with more than two groups able to participate in the polymerization reaction. Such monomers create branching of polymer chains or cross-linking between polymer chains and may be present as up to 15%, preferably 1 to 10% by weight of the liquid components of the polymerisable composition.

The groups able to participate in the polymerization reaction may be olefinically unsaturated groups. Polymerizable monomers may be esters of an olefinically unsaturated acid and a dihydroxy compound (although such esters may be manufactured using other starting materials such as an acid chloride, of course) The acid moiety is preferably an

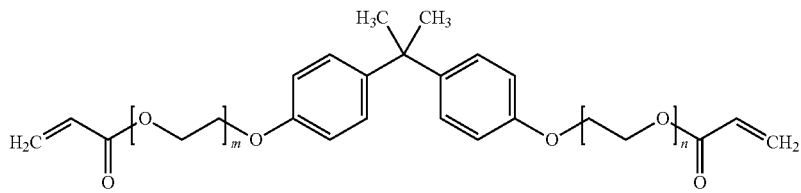

bisphenol A ethoxylate dimethacrylates, having the general formula

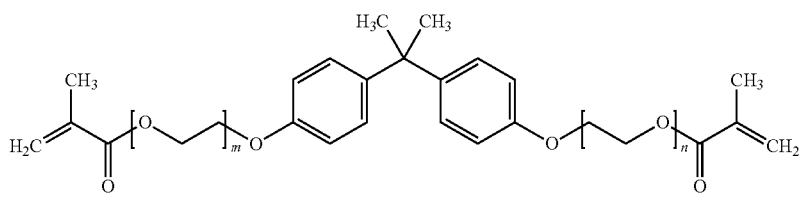

and poly(ethylene glycol) diacrylates having general formula:

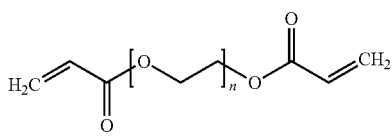

In the above three general formulae, m and n are average values and may vary. Generally they will lie in a range up to 15, such as 1 or 1.5 up to 15 but preferably not above 6. We have found that monomers containing ethylene oxide residues improve flexibility of the polymer but reduce its strength.

The composition preferably also includes some monomer with more than two olefinically unsaturated groups, to create branched or cross-linked polymer chains. Such compounds may be acrylate or methacrylate esters of poly hydroxy compounds.

Some examples are as follows:

| Name | Formula | MW (g/mol) |
| --- | --- | --- |
| trimethylolpropane triacylate | | 296 |
| trimethylolpropane ethoxylate triacrylate | | |

The average value of n in the above formula may be chosen so that the mean molecular weight is about 430, about 600 or about 900

| Name | Formula | MW (g/mol) |
|---|---|---|
| pentaerythritol tetraacrylate | | 352 |
| di(trimethylolpropane) tetraacrylate | | 466 |

Monomer compounds with two olefinically unsaturated groups may also be vinyl ethers such as 1,6-hexane diol divinyl ether, poly(ethylene glycol) divinyl ether, bis-(4-vinyl oxy butyl)hexamethylenediurethane, and vinyl ether terminated esters such as bis-(4-vinyl oxy butyl) adipate and bis-(4-vinyl oxy butyl) isophthalate.

Another possibility is that the groups able to participate in the polymerization reaction are epoxide groups. A suitable category of monomer compounds containing epoxide groups are glycidyl ethers of dihydroxy compounds, some specific possibilities being 1,6-hexanediol diglycidyl ether, bisphenol A diglycidyl ether and poly(ethylene glycol) diglycidyl ether.

The polymerisable composition may comprise a mixture of monomers. Notably a mixture of monomers may be used in order to obtain a desired combination of mechanical properties of the polymer lining on the tubing. The monomers will generally provide at least 50 wt % of the composition and preferably from 70 to 99.5 wt % of it.

The polymerisable composition may include one or more solids serving to reinforce it after polymerisation. Such a solid material included to reinforce the composition may be particulate, such as bentonite clay particles, or may be short fibres such as chopped glass fibres. These materials may have an additional effect of enhancing viscosity. Another reason for including a solid would be to raise the specific gravity by adding a solid filler which is denser than the polymer. The polymerisable composition may contain from 0 to 20 wt % of such solids, possibly even up to 30 wt % or above.

The sections 54 of the belt 50 may be made by an additive manufacturing process. An additive manufacturing process may be implemented to construct an object in accordance with a design held in digital form. The process progressively adds material at selected locations within a workspace, so that the added material joins on to material already present. Such a process is termed "additive" because more material is progressively added in order to arrive at the finished article, in contrast with traditional machining processes which remove material from a workpiece in order to create the desired shape. Several additive processes are known and are sometimes referred to as three-dimensional printing (3D-printing) although that term may also be reserved for one or only some of these additive manufacturing processes.

The term "3D printing" may be used for a process which uses a movable printing head to deliver a droplet of a polymerisable liquid composition to each selected location. The composition may for instance be photopolymerisable by ultraviolet or visible light, and the polymerisation is initiated by illuminating the work space with ultra-violet or visible light while the print head delivers droplets of composition to the selected locations. The photopolymerisation joins each droplet onto material which has already been delivered and polymerised. A process of this kind and apparatus for the purpose was described in U.S. Pat. No. 5,287,435 although there have been numerous subsequent developments as for instance disclosed in U.S. Pat. Nos. 6,658,314 and 776,641.

A 3D printing process may be used to print a section 54 of the belt 50 by printing a composition which becomes a rubber-like elastomer as it is printed. This elastomer may be printed using a single composition or by using a combination of an elastomer and a more rigid material, so as to produce a belt 50 which is more rigid, but still bendable. As the elastomer is printed to form the section 54 of belt, a temporary support material is printed at the positions which become mould cavities. When the printing process has been completed this temporary support material is removed, so as to leave empty mould cavities 56.

Machines for 3D printing are available from several manufacturers, including Stratasys, located in Edina, Minnesota and elsewhere. A commercially available 3D-printing machine may for example print objects within a space slightly larger than a 20 cm cube, printing them as layers each of which has a thickness of 16 or 32 microns and a resolution of about 20 points per mm.

Another additive process which provides an alternative way to make sections 54 of the belt 50 is stereolithography in which a volume of polymerisable liquid is selectively polymerised at selected locations by irradiating with a laser as described in U.S. Pat. No. 5,778,567.

The above description has referred to moulds make of an elastomeric material, used to mould objects with a flat surface which corresponds to the surface of liquid in the mould cavity. However, it would be possible to mound shapes without such flat surface, by using moulds made by 3D printing with a material with a melting point in a range from 50 to 100° C. or which is water soluble and which can be melted or dissolved to release the moulded objects.

In another approach for making sections 54 of the belt 52, an additive process such as 3D printing is used to make a preliminary mould for a section 54 of the belt. Such a preliminary mould can take the form of a tray with replicas of the intended objects positioned on the base of the tray and integral with it. Such a mould may be rigid. A section of the belt with mould cavities in it is then made by a casting process in which this preliminary mould is filled with a composition which cures to an elastomer whilst in the mould.

This approach necessitates an additional manufacturing step because the preliminary mould made by 3-D printing is used to make sections 54 of the belt 50, and these sections are subsequently used to make the desired objects such as those shown in FIGS. 3 to 6. However, this two-step process may be advantageous in that it may allow a wider choice of elastomer material for making the sections 54 of the belt 50.

It will be appreciated that the methods described above utilise the ability of additive manufacturing to fabricate desired shapes, such as the complex shapes shown by FIGS. 5 and 6, but the additive process is used as a toolmaking stage and the eventual bulk plastic objects are produced in bulk by a casting process.

It will be appreciated that the example embodiments described above can be modified and varied within the scope of the concepts which they exemplify. Features referred to above or shown in individual embodiments above may be used together in any combination as well as those which have been shown and described specifically. Accordingly, all such modifications are intended to be included within the scope of this disclosure as defined in the following claims.

The invention claimed is:

1. A method of making solid objects formed of polymeric material, the method comprising:
   providing at least one mould for the solid objects;
   introducing a curable liquid composition into the mould;
   curing the curable liquid composition to a solid state in the mould; and
   releasing the cured solid objects from the mould;
   wherein the cured solid objects:
      have sufficient rigidity to sustain their own shape,
      have an overall size that allows passage through a jet of a drill bit and that extends at least 0.5 mm in each of three orthogonal dimensions, and
      have a shape such that each object has one or more edges, points or corners and/or comprises a core portion with a plurality of projections that extend out from the core portion.

2. The method of claim 1, wherein the mould is flexible and the method comprises bending the at least one mould to eject the cured solid objects.

3. The method of claim 2, wherein a plurality of moulds are formed in an endless belt, the method comprising moving the belt through a mould-filling station at which the curable liquid composition is introduced into the mould, through a curing zone and then around a bend at which the cured solid objects are ejected from the moulds in the belt.

4. The method of claim 3, wherein moving the belt around the bend comprises running the belt around a roller to change its direction of motion.

5. The method of claim 1, wherein releasing the cured solid objects from the mould comprises melting or dissolving the mould.

6. The method of claim 1, wherein curing the curable liquid composition comprises a photocuring process in which the composition is irradiated with visible or ultraviolet light to initiate polymerisation.

7. The method of claim 1, further comprising;
   making the at least one mould by an additive manufacturing process.

8. The method of claim 3, further comprising;
   making a part of the belt with moulds therein by inkjet printing of a flexible polymer.

9. The method of claim 1, wherein at least some of the cured solid objects have a shape which is at least partially bounded by surfaces which intersect at an edge.

10. The method of claim 9, wherein at least some of the cured solid objects have shapes where an angle between surfaces intersecting at an edge is not more than 150°.

11. The method of claim 1, wherein at least some of the cured solid objects have a shape such that the object has one or more points or corners which include angles which are less than 90° when viewed in two orthogonal directions or which include a solid angle of less than $0.5\pi$ steradians.

12. The method of claim 1, wherein at least some of the cured solid objects comprise a core with a plurality of projections that extend out from the core.

13. The method of claim 12, wherein the projections extend out from the core for a distance greater than a distance across the core.

14. The method of claim 1, wherein the cured composition is an organic polymer with a specific gravity in a range from 0.8 to 1.2.

15. The method of claim 1, wherein at least some of the cured solid objects are too large to fit within a sphere of 1mm diameter, but are able to fit within a sphere of 8 mm diameter.

16. The method of claim 1, wherein the cured solid objects are dimensioned such as to be too large to fit inside a sphere of 1.5 mm diameter but small enough to fit inside a sphere with a diameter of 6 mm.

17. The method of claim 1, further comprising;
   incorporating the objects into a drilling fluid and circulating the drilling fluid down and back up a borehole.

* * * * *